Aug. 26, 1969     J. A. ANDREWS ET AL     3,462,837

DENTURE SECURING MEANS

Filed June 8, 1967     2 Sheets-Sheet 1

James A. Andrews
Glenn A. Bahm
Riley B. Dodson
John N. Walker
            INVENTORS BY Schmidt, Johnson, Hovey,
    Williams & Bradley
            ATTORNEYS Aug. 26, 1969                J. A. ANDREWS ET AL                3,462,837
                              DENTURE SECURING MEANS
Filed June 8, 1967                                          2 Sheets-Sheet 2

James A. Andrews
Glenn A. Bahm
Riley B. Dodson
John N. Walker
                INVENTORS BY  *Schmidt, Johnson, Hovey,
    Williams & Bradley*
                ATTORNEYS

United States Patent Office 3,462,837  
Patented Aug. 26, 1969

---

3,462,837  
DENTURE SECURING MEANS  
James A. Andrews, Amite, and Glenn A. Bahm, Independence, La., and Riley B. Dodson and John N. Walker, Dallas, Tex., assignors to Institute of Cosmetic Dentistry, Incorporated, parish of Tangipahoa, La., a corporation of Louisiana  
Filed June 8, 1967, Ser. No. 644,514  
Int. Cl. A61c *13/22*  
U.S. Cl. 32—5   10 Claims

ABSTRACT OF THE DISCLOSURE

A dental appliance comprises two separable sections, a removable framework or plate and a bridge. The framework is placed in position by lingual insertion and engages natural teeth in the undercut formed thereby. The bridge is locked on the framework by a bar and sleeve interconnection, and can be placed in position only after installation of the framework. Either labial insertion or insertion by a lateral, cheek-to-cheek movement is employed to install the bridge on the framework, the separate paths of insertion of the framework and bridge cooperating to preclude inadvertent loosening of the appliance during use since installation of the appliance, and thus the removal thereof, cannot be effected with the framework and bridge interconnected as a unit.

---

Ideally, a denture should be completely removable to permit thorough cleaning and removal of oral products. Heretofore, however, it has been necessary to permanently affix at least a portion of the denture in order to assure that the pontics will remain fixed in place during chewing. The partially removable denture is also advantageous in that it permits a tissue flange to be utilized in conjunction with the pontics so that the appearance of the wearer is greatly enhanced.

It is, therefore, the primary object of this invention to provide a dental appliance which is completely removable and yet will remain fixed in place in the wearer's mouth.

As a corollary to the foregoing object, it is an important aim of the instant invention to provide a multiple section dental appliance which, when assembled as a unit, cannot be positioned in its proper place within the mouth of the wearer but, when separated into its component sections, may be installed by separate insertion of the sections.

A further and important object of the invention is to provide a sectional dental appliance as aforesaid in which separate paths of insertion are employed with respective sections thereof, in order that the interference with natural teeth established after complete installation serves as a means of preventing inadvertent loosening of the installed denture.

A specific object of the invention is to provide various bar and sleeve interconnecting means for use in releasably interlocking the separate sections of the aforesaid sectional dental appliance, particularly the framework and bridge thereof.

Figure 1:
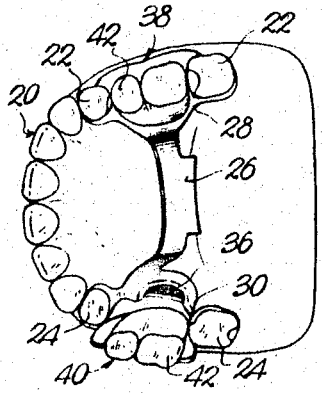
FIGURE 1 is a bottom view of an upper arch showing one embodiment of the instant invention in place thereon, one of the bridges being partially removed.
Figure 2:
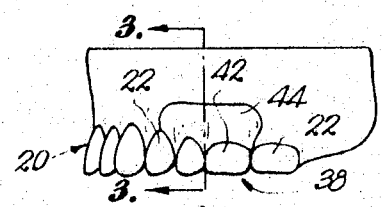
FIG. 2 is a side elevational view of the arch and denture structure shown in FIG. 1.
Figure 3:
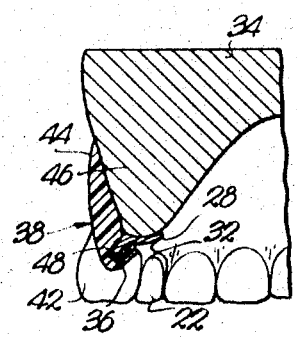
FIG. 3 is a sectional view taken along line 3—3 of FIG. 2.

Referring to FIGS. 1–3, an arch 20 has a pair of posterior abutment teeth 22 on the left side thereof, and a pair of posterior abutment teeth 24 on the right side thereof. The abutments 22 and 24 are spanned by a metal framework or plate 26 having opposed end portions 28 and 30 that extend into the undercut formed by teeth 22 and 24 respectively. This is particularly clear in FIG. 3 where the undercut 32 formed by the forwardmost tooth 22 is revealed. End portion 28 extends into undercut 32 and engages the narrower, intermediate or shank portion of tooth 22 between the enlarged head and the roots embedded in the natural gum tissue 34. An inwardly curved, serrated bar 36 is fused to each end portion 28 or 30 and extends generally in the direction of arch 20, each bar 36 being transversely outwardly inclined.

A pair of removable bridges 38 and 40 are provided with pontics 42 and are positioned on end portions 28 and 30 respectively of framework 26. The construction of bridge 38 is shown in detail in FIG. 3, where it may be noted that a plastic tissue flange 44 extends upwardly from pontics 42 and complementally overlies the natural ridge 46 formed by gum 34 after and extraction. An elongated, transversely U-shaped sleeve 48 is embedded in the artificial tissue flange 44 and pontics 42 and embraces bar 36, the latter being serrated to provide a tight, frictional fit between bar 36 and sleeve 48.

Figure 4:
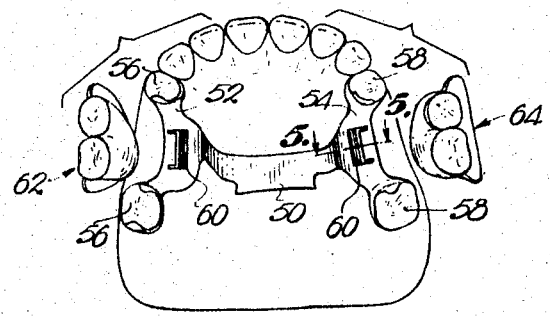
FIG. 4 is a bottom view of an upper arch showing a second embodiment of the invention, the latter being illustrated in exploded form to reveal the manner of locking the bridges to the framework.
Figures 5, 6:
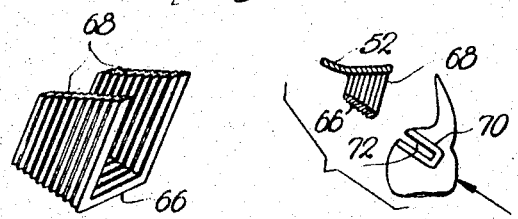
FIG. 5 is a sectional, exploded view taken along line 5—5 of FIG. 4.
FIG. 6 is a perspective, detail view of the bar shown in FIGS. 4 and 5.

In FIGS. 4–6, a similar metal framework 50 is shown having opposed end portions 52 and 54 fitting into the undercuts formed by a pair of abutment teeth 56 and a pair of abutment teeth 58 respectively. A pair of longitudinally U-shaped bars 60 are embedded in end portions 52 and 54, bars 60 cooperating with bridges 62 and 64 to lock the same in position between abutment teeth 56 and teeth 58 respectively. Other than the configuration of bars 60, the denture structure illustrated in FIGS. 4–6 is identical to that described above with respect to FIGS. 1–3.

Each bar 60 has a bight 66 and a pair of legs 68, the latter being fused to framework 50 to secure bight 66 to the framework in spaced relationship thereto, as is clear in FIG. 5. Bar 60 is provided with longitudinal serrations on both of its major faces; thus, bight 66 presents a pair of opposed, corrugated surfaces to assist in frictionally securing the bridge 62 or 64 thereto as bight 66 is received by a sleeve 70 carried by the bridge. The sleeve 70 is of elongated, transversely U-shaped configuration, defining a channel or groove 72 therewithin configured to complementally receive bight 66.

Figure 7:
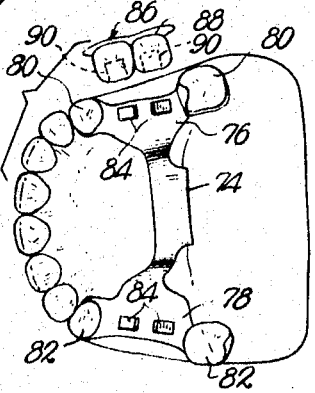
FIG. 7 is a bottom view of an upper arch showing a third embodiment of the instant invention, the bridges being removed from the framework.
Figure 8:
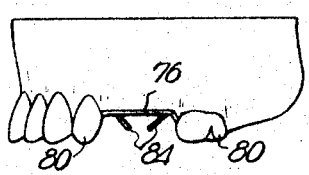
FIG. 8 is a side elevational view of the arch shown in FIG. 7.
Figure 9:
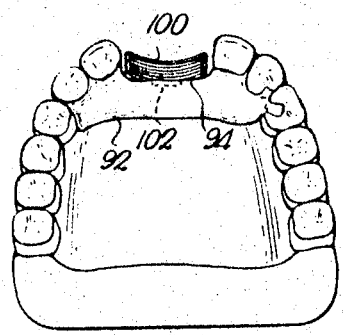
FIG. 9 is a bottom view of an upper arch illustrating a fourth embodiment of the instant invention, the bridge being removed.
Figure 10:
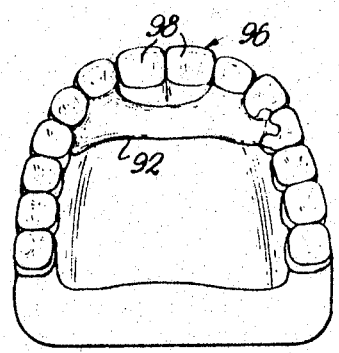
FIG. 10 is a view similar to FIG. 9 showing the bridge in place.
Figure 11:
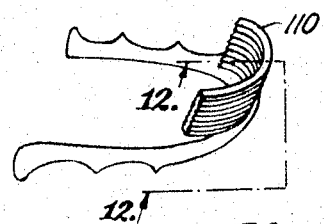
FIG. 11 is a perspective view of the bridge-connecting bar of the embodiment of FIGS. 9 and 10, FIG. 11 showing a modified form of framework for an anterior bridge for use on the lower jaw.
Figure 12:
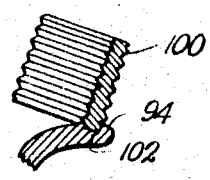
FIG. 12 is a cross-sectional view taken along line 12—12 of FIG. 11.

The embodiment of the invention illustrated in FIGS. 7 and 8 also utilizes a framework 74 similar to frameworks 26 and 50 of the previously described embodiments. Framework 74 has opposed end portions 76 and 78 which fit into the undercuts formed by a pair of abutment teeth 80 and a pair of abutment teeth 82 respectively. In this embodiment, however, each end portion 76 or 78 is provided with a pair of locking bars 84 in the form of downwardly extending tabs or projections. It should be noted that bars 84 are disposed at opposite anterior-posterior longitudinal inclinations with each pair of bars 84 converging toward each other. Alternatively, the bars may be disposed in diverging, inclined relationship to each other, it being appreciated that, for a lower arch, the bars would project upwardly from the framework between the abutment teeth rather than downwardly therebetween. The anchored ends of bars 84 may be fused to end portions 76 or 78 or may be provided with feet (not shown) embedded in the metal framework.

One of the two posterior bridges 86 for framework 74 is illustrated in FIG. 7, and includes a pair of pontics 88 fitted with sleeves defining side slots 90 which receive bars 84 as bridge 86 is placed in position, the bridge being installed by a lateral path of insertion extending inwardly from the cheek.

The embodiment of FIGS. 9–12 comprises a framework or plate 92 having a forward edge portion 94 which serves as a support for an anterior bridge 96 having a pair of pontics 98. An elongated bar 100 has a longitudinal axis defining an arc of a circle, one of the arcuate, longitudinal edges 102 of bar 100 being embedded in edge portion 94. The outer periphery of frame 92 fits into the undercut formed by the natural teeth adjacent bridge 96 in a manner analogous to that described above for the previous embodiments. Bridge 96 is provided with an arcuate sleeve (not shown) embedded therein which receives bar 100 and embraces the latter, the bar being provided with longitudinal serrations to increase the frictional adherence of the bar and the sleeve when bridge 96 is in place. Bars and sleeves of arcuate configuration are particularly desirable in that they allow for interchangeability with other manufactured parts of the same diameter.

Figure 13:
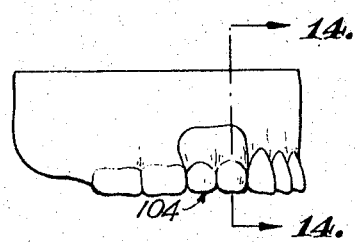
FIG. 13 is a side elevational view of an upper arch showing a fifth embodiment of the instant invention.
Figure 14:
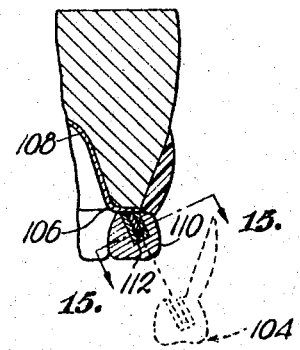
FIG. 14 is a sectional view taken along line 14—14 of FIG. 13.
Figure 15:
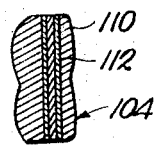
FIG. 15 is a sectional view taken along line 15—15 of FIG. 14.

Another embodiment of the invention is shown in FIGS. 13–15. A posterior bridge 104 is shown supported by the end portion 106 of a metal framework 108 similar to frameworks 26, 50 and 74. An elongated, transversely outwardly inclined bar 110 is fused to end portion 106 and is received within a sleeve 112 carried by bridge 104. Bar 110 differs from bar 36 shown in FIGS. 1 and 3 in that bar 110 is longitudinally straight rather than curvilinear.

In use, each of the frameworks of the various embodiments of the instant invention is installed in the mouth by lingual insertion, the end or edge portions of the framework fitting into the undercut formed by the natural teeth. In the embodiments illustrated in FIGS. 1–6 and 9–15, the bridge or bridges are then installed by labial insertion. As discussed above, a lateral, cheek-to-cheek movement of bridge 86 is employed for insertion thereof in the embodiment of the invention shown in FIGS. 7 and 8. Therefore, it will be appreciated that, in each of the embodiments, the paths of insertion of the framework and the bridge or bridges, extend in different directions.

If it is attempted to assemble the denture prior to installation thereof, it will be found that the appliance is incapable of insertion within the mouth. Installation can only be effected by first inserting the framework and then inserting the bridge or bridges. Hence, once inserted, removal as a unit cannot be effected due to the interference with the natural teeth. Therefore, in order to remove the denture, the bridges are withdrawn and then the framework is removed, in that order. It will thus be appreciated that the different paths of insertion and removal enable the natural teeth to effectively hold the appliance in the mouth as a unit without requiring abutment preparations and permanent affixing of the framework to the natural teeth.

Having thus described the invention, what is claimed as new and desired to be secured by Letters Patent is:

1. A removable dental appliance comprising:
   a framework having means enabling the framework to engage natural teeth in an undercut for retention thereby upon movement into the undercut along a first path of insertion; and
   a bridge having at least one pontic,
   said framework having a portion for supporting the bridge,
   said bridge and said portion being provided with cooperable locking elements, one of said elements being disposed in a plane inclined with respect to the teeth to define a second different path of insertion of said bridge for movement of the latter therealong to said portion,
   said elements, upon a movement of said bridge along said second path of insertion, interengaging to releaseably secure the bridge to the framework.

2. The invention of claim 1,
   said first path of insertion being directed toward said teeth from the tongue,
   said second path of insertion being directed toward said portion through the lips.

3. The invention of claim 1,
   said first path of insertion being directed toward said teeth from the tongue,
   said portion being disposed at the posterior of the framework,
   said second path of insertion being directed laterally of the framework from cheek to cheek.

4. The invention of claim 1,
   said elements including an elongated bar mounted on said portion, and a sleeve carried by said bridge for embracing said bar,
   said bar being transversely outwardly inclined,
   said bar and said sleeve having means maintaining the same in tight frictional interengagement when the bar is embraced by the sleeve.

5. The invention of claim 4,
   said bar being longitudinally inwardly curved.

6. The invention of claim 4,
   said bar being longitudinally U-shaped.

7. The invention of claim 6,
   said bar having a bight and a pair of legs,
   said bight having said transverse outward inclination,
   said legs being secured to said portion and mounting said bight in spaced relationship to said portion.

8. The invention of claim 4,
   the longitudinal axis of said bar defining an arc of a circle,
   said bar having an arcuate, longitudinal edge rigid with said portion.

9. The invention of claim 4,
   said bar being longitudinally straight.

10. The invention of claim 1,
    said elements including a pair of spaced bars rigid with said portion, and a pair of sleeves carried by said bridge for embracing corresponding bars, said bars extending from said portion at opposite anterior-posterior inclinations, said bars and said sleeves having means maintaining each sleeve and the corresponding bar in tight frictional interengagement when the bars are embraced by the sleeves.

References Cited

FOREIGN PATENTS 387,224  5/1965  Switzerland.
778,839  1/1935  France.
903,449  8/1962  Great Britain.

ROBERT PESHOCK, Primary Examiner